(No Model.)
G. W. KING.
REVERSING GEAR.
No. 528,780. Patented Nov. 6, 1894.
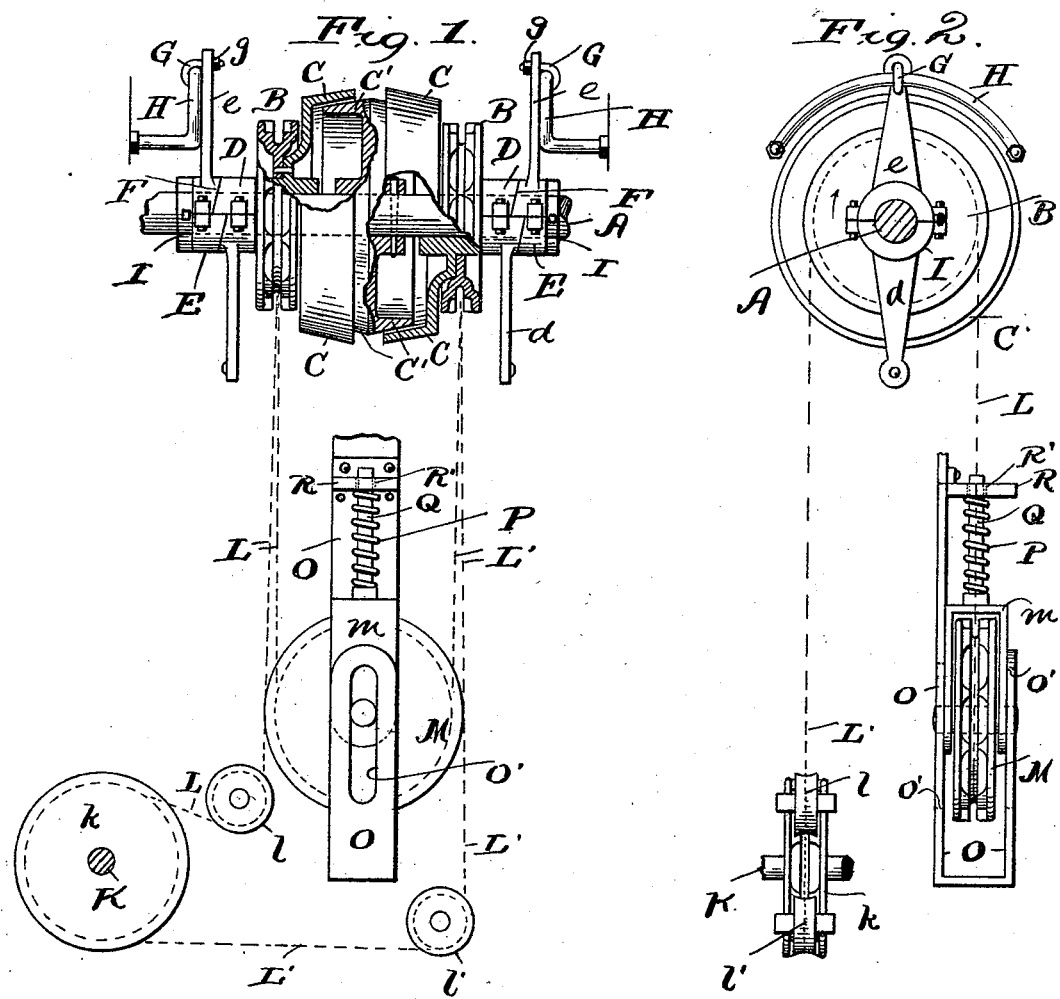

UNITED STATES PATENT OFFICE.

GEORGE W. KING, OF MARION, OHIO.

REVERSING-GEAR.

SPECIFICATION forming part of Letters Patent No. 528,780, dated November 6, 1894.

Application filed December 26, 1893. Serial No. 494,712. (No model.)

*To all whom it may concern:*

Be it known that I, GEORGE W. KING, of Marion, in the county of Marion and State of Ohio, have invented certain new and useful Improvements in Reversing-Gears; and I do hereby declare the following to be a full, clear, and exact description of the invention, such as will enable others skilled in the art to which it pertains to make and use the same.

My invention relates to an improved reversing-gear or mechanism whereby the direction of motion of one part of a machine can be reversed while the other part of the machine runs continually in one direction; and my invention consists in certain features of construction and in combination of parts hereinafter described and pointed out in the claim.

In the accompanying drawings, Figure 1 is a plan view, partly in section, of reversing-gear or mechanism embodying my invention. Fig. 2 is a right hand side elevation, relative to Fig. 1.

Referring to the drawings, A represents a horizontal shaft adapted to rotate continuously in one direction. Two pocket-pulleys, B, are shown loosely mounted upon said shaft a suitable interval apart. Said pulleys, at their inner ends, carry, respectively, the one member C of a clutch, the other members C' C' of the clutches being operatively mounted upon the shaft in any suitable manner. I prefer the employment of friction-clutches, and members C of said clutches, that, as already indicated, are rigid or operatively connected with pulleys or wheels B and are normally out of operative connection with the shaft, constituting the female members of said clutches, whereas members C' constitute the male members of the clutches and are preferably integral with each other.

Upon shaft A, at the outer end of each pulley B, are loosely mounted two collars D and E, the outer collars, E, E, being held stationary, and each having a laterally-extending arm, e, which, by means of a bolt and nut G g, connected to each arm respectively, is secured to any suitable support H. In the case illustrated, support H is a quadrant or segment, and bolt G has a hooked head adapted to grip member H and caused to tightly engage member H by tightening nut g on the bolt. Collars E are held, respectively, from moving endwise on the supporting-shaft, in the direction away from the contiguous collar D, by means of collars I rigid on the shaft.

The opposing ends or surfaces of the contiguous collars D E are provided, respectively, with one or more inclines, f, the arrangement and trend whereof are such that the adjacent clutch-member-bearing pulley, by turning collar E in the one direction, is actuated to bring the clutch-member carried thereby into frictional engagement with the companion clutch-member and thereby establishing operative connection between said pulley and the shaft, and when the members of the clutch are in operative connection with each other by turning collar E in the opposite direction the pulley bearing one of the clutch-members is released or loosened.

K designates a vertical shaft to which motion is to be communicated from shaft A and which shaft K is to be rotated alternately in opposite directions. A pocket-pulley $k$ is shown operatively mounted upon shaft K, and an endless chain leads over said pulley, the sections L L' leading from opposite sides of said pulley, respectively, being shown extending thence to and over guide-sheaves $l\,l'$, respectively, thence leading to and over pulleys B B, respectively, and thence leading to and over an idler and tightener M where they meet. It will thus be observed that the endless chain, and consequently shaft K, are rotated in the one direction or the other according as one or the other of pulleys B is operatively connected with shaft A.

My improved reversing-gear, it will be observed, can be used to advantage wherever a reverse motion is desired to be taken from a shaft or source of power rotating continuously in one direction, and the reversible shaft or member can be rotated in either direction for an indefinite length of time, as the connecting-chain or belt is endless.

Collars D have, respectively, a laterally-extending arm $d$ for the attachment of lever-mechanism (not shown) for operating the collar.

The strap or block $m$ that bears the tightening sheave is preferably slidably supported between stationary guides O and is acted upon to cause the sheave to take up any slack in chain or belt L L' by means of a coil-spring, P, mounted upon a rod or member Q suitably attached to the sheave-block or strap and extending easily through a hole R' in a stationary bracket or member R, the coil-spring being confined upon member Q between stationary member R and the sheave-block or strap. The axial pin of the sheave engages holes O' in guides O and said holes are elongated in the direction required to accommodate the action of the aforesaid spring. The latter, it will also be observed, acts to cushion the idler, and tightener.

I would have it understood that my invention is not confined to the precise construction and arrangement of parts shown. For instance, the shaft that bears pulleys B and the one member of the clutches, might be the reversible shaft, and shaft K might be the shaft that is rotated continuously in one direction without departing from the spirit and purpose of my invention.

Having thus described my invention, what I claim is—

The combination with a shaft adapted to rotate continuously in one direction and a reversible shaft, of two pulleys mounted loosely upon one of said shafts, a clutch for each of said pulleys, one member of each clutch being rigid or operatively connected with the pulley and the companion member of the clutch being operatively connected with the pulley-supporting-shaft, stationary guides O located in suitable proximity to the pulleys, tightening sheave M, strap or block $m$ bearing said sheave, rod or member Q rigid with the sheave-block or strap, stationary bracket or member R, coil-spring P confined upon member Q between the sheave-block or strap and member R, the aforesaid guides having holes O' engaged by the axial pin of the tightening-sheave and elongated in the direction required to accommodate the action of the aforesaid spring, endless-chain or belt-engaging the idler and operatively connected with the aforesaid pulleys and with the other shaft in such a manner that the reversible shaft is rotated in the one direction or the other according as the one or the other of the aforesaid pulleys is operatively connected with the pulley-bearing-shaft, all arranged and operating substantially as shown and described.

In testimony whereof I sign this specification, in the presence of two witnesses, this 1st day of November, 1893.

GEORGE W. KING.

Witnesses:
C. H. DORER,
ROLLA C. PERRY.